(12) United States Patent
Lacroix

(10) Patent No.: US 9,971,428 B2
(45) Date of Patent: May 15, 2018

(54) DEVICES, SYSTEMS, AND METHODS FOR USING CORRUGATED TESSELLATION TO CREATE SURFACE FEATURES

(71) Applicant: Immersion Corporation, San Jose, CA (US)

(72) Inventor: Robert Lacroix, St. Lambert (CA)

(73) Assignee: Immersion Corporation, San Jose, CA (US)

( * ) Notice: Subject to any disclaimer, the term of this patent is extended or adjusted under 35 U.S.C. 154(b) by 67 days.

(21) Appl. No.: 14/143,917

(22) Filed: Dec. 30, 2013

(65) Prior Publication Data

US 2015/0185885 A1 Jul. 2, 2015

(51) Int. Cl.
| | |
|---|---|
| *G06F 3/041* | (2006.01) |
| *G06F 3/0488* | (2013.01) |
| *G06F 3/023* | (2006.01) |
| *G06F 1/16* | (2006.01) |

(52) U.S. Cl.
CPC ............ *G06F 3/041* (2013.01); *G06F 1/1652* (2013.01); *G06F 3/023* (2013.01); *G06F 3/04883* (2013.01); *G06F 3/04886* (2013.01)

(58) Field of Classification Search
None
See application file for complete search history.

(56) References Cited

U.S. PATENT DOCUMENTS

| | | | | |
|---|---|---|---|---|
| 2009/0128376 A1* | 5/2009 | Caine | ...................... | H04M 1/23 341/34 |
| 2009/0128503 A1* | 5/2009 | Grant | ...................... | G06F 3/016 345/173 |
| 2010/0315399 A1 | 12/2010 | Jacobson | | |
| 2011/0205169 A1* | 8/2011 | Yasutake | ............. | G06F 3/03547 345/173 |
| 2011/0227822 A1* | 9/2011 | Shai | ...................... | G06F 1/1615 345/156 |

(Continued)

FOREIGN PATENT DOCUMENTS

EP        2 613 244 A2    7/2013

OTHER PUBLICATIONS

European Patent Office Application No. 14200436.5, Communication Pursuant to Rule 69 EPC dated Jul. 6, 2015, 2 pages.

(Continued)

*Primary Examiner* — Ryan A Lubit
(74) *Attorney, Agent, or Firm* — Kilpatrick Townsend & Stockton LLP

(57) ABSTRACT

Devices, systems and methods for using corrugated tessellation to create surface features are disclosed. In embodiments, a device comprises a touch-sensitive surface capable of being in a first configuration and a second configuration different than the first configuration. When the touch-sensitive surface is in the second configuration an input device may be provided that is not present when the touch-sensitive surface is in the first configuration. For example, the touch-sensitive surface can be a flat surface in the first configuration and can be a three-dimensional surface comprising a physical keyboard in the second configuration. In embodiments, a device, such as a mobile phone or a tablet computer, comprises a touch-sensitive display that comprises the touch-sensitive surface.

17 Claims, 7 Drawing Sheets

(56) References Cited

U.S. PATENT DOCUMENTS

| | | | |
|---|---|---|---|
| 2011/0290038 A1* | 12/2011 | Hoshino | G01L 1/20 |
| | | | 73/862.627 |
| 2012/0188153 A1* | 7/2012 | Tziortzis | G06F 1/1641 |
| | | | 345/156 |
| 2013/0044215 A1* | 2/2013 | Rothkopf | G06F 1/163 |
| | | | 348/143 |
| 2013/0307816 A1 | 11/2013 | Lee | |
| 2014/0004906 A1* | 1/2014 | Chi | H04B 1/38 |
| | | | 455/566 |

OTHER PUBLICATIONS

European Patent Office Application No. 14200436.5, Extended European Search Report dated May 20, 2015, 8 pages.

Vitushinsky, "Bistable Thin-film Shape Memory Actuators for Applications in Tactile Displays", Journal of Microelectromechanical Systems, vol. 18, No. 1, Feb. 2009, 9 pages.

* cited by examiner

DEVICES, SYSTEMS, AND METHODS FOR USING CORRUGATED TESSELLATION TO CREATE SURFACE FEATURES

FIELD

The present disclosure relates generally to devices, systems and methods for using corrugated tessellation to create surface features.

BACKGROUND

Traditionally, mechanical buttons have provided physical tactile sensations to the users of handheld mobile devices. However, with the increase in popularity of touch-sensitive surfaces (e.g., touch screens) on these devices, especially on mobile phones, the mechanical buttons are often no longer present. Instead, haptic output devices may be included in such devices to output haptic effects that alert the user to various events.

SUMMARY

Embodiments provide devices, systems and methods for using corrugated tessellation to create surface features. For example, in one embodiment, a device comprises a touch-sensitive surface capable of assuming a first configuration and a second configuration. The touch-sensitive surface may define a first input device when in the second configuration. The touch-sensitive surface may not define the first input device when in the first configuration. The first input device may be a three-dimensional button and/or a three-dimensional key. In one embodiment, the first input device is a physical keyboard.

In embodiments, a device comprises a touch-sensitive display comprising a touch-sensitive surface. The touch-sensitive display may be configured to receive input via contact with locations on the touch-sensitive display when the touch-sensitive surface is in the first configuration. The touch-sensitive display can be configured to receive input via the first input device when the touch-sensitive surface is in the second configuration. In some embodiments, the touch-sensitive display comprises a substantially flat viewing area when the touch-sensitive surface is in the first configuration. The touch-sensitive display can comprise a first portion comprising a substantially flat viewing area. The touch-sensitive display may have a second portion comprising the first input device when the touch-sensitive surface is in the second configuration. The first portion may be angled relative to the second portion.

In some embodiments, a touch-sensitive surface comprises a plurality of folds. One or more of the plurality of folds may be configured to assist in converting a touch-sensitive surface from a first configuration to a second configuration when an appropriate force is applied to the touch-sensitive surface. In one embodiment, an appropriate force comprises a manual bending of a portion of the touch-sensitive surface. One or more folds can comprise a predetermined tension configured to cause a touch-sensitive surface to maintain a first configuration until an appropriate force is applied to the touch-sensitive surface. One or more folds may comprise a predetermined tension configured to cause a touch-sensitive surface to maintain a second configuration once an appropriate force has been applied to the touch-sensitive surface.

In embodiments, a device comprises a plurality of actuators. One or more of the actuators may be configured to cause an appropriate force to a plurality of folds such that a touch-sensitive surface changes from a first configuration to a second configuration. When in the second configuration, the touch-sensitive surface may comprise a keyboard comprising one or more keys. In embodiments, one or more actuators can detect pressures corresponding to key presses of one or more of the keys when the touch-sensitive surface is in the second configuration. In embodiments, a touch-sensitive surface is bi-stable. For example, the touch-sensitive surface can be configured to be in either a first configuration or a second configuration.

In embodiments, a device comprises a plurality of input devices when a touch-sensitive surface is in a first configuration. In this embodiment, the device may comprise a second plurality of input devices when the touch-sensitive surface is in a second configuration. The first plurality of devices may be different from the second plurality of devices. For example, in one embodiment, the second plurality of devices comprises one or more input devices when the touch-sensitive surface is in the second configuration that the first plurality of devices does not have when the touch-sensitive surface is in the first configuration. The device may be a wireless phone, table computer, or any other suitable electronic device. In embodiments, a device having a touch-sensitive surface is portable and is configured for use as a physical keyboard when connected with a compatible electronic device and the touch-sensitive surface is in a second configuration. In this embodiment, the device may not be configured for use as a physical keyboard when the touch-sensitive surface is in a first configuration different than the second configuration.

In one embodiment, a method comprises receiving, by a processor, a first input. The first input may indicate that a touch-sensitive surface should be converted from a first configuration to a second configuration different from the first configuration. In this embodiment, the method further comprises generating, by the processor, a signal configured to cause one or more actuators to convert the touch-sensitive surface from the first configuration to the second configuration. In this embodiment, the method further comprises outputting, by the electronic device, the signal to one or more actuators. The touch-sensitive surface may comprise a first input device when in the second configuration that the touch-sensitive surface does not comprise when in the first configuration. In one embodiment, the method further comprises receiving, by the processor, a second input via the first input device when the touch-sensitive surface is in the second configuration. In this embodiment, the method further comprises displaying, by the processor, information on a display associated with the touch-sensitive surface based at least in part on the second input.

In one embodiment, a method comprises receiving, by a processor, first information. In this embodiment, the method further comprises determining, by the processor, a first layout for a touch-sensitive surface based at least in part on the first information. The first layout may be different from a current layout of the touch-sensitive surface. In some embodiments, the method further comprises generating, by the processor, a signal configured to cause the touch-sensitive surface to convert from the current layout to the first layout. In this embodiment, the method further comprises outputting, by the processor, the signal. The touch-sensitive surface can comprise a first input device when in the first layout that the touch-sensitive surface does not comprise in the second layout. In some embodiments, the current layout comprises the touch-sensitive surface having a substantially flat surface. The first layout may comprise the touch-sensitive surface having a three-dimensional surface. In embodiments, the three-dimensional surface can define a first input device and the first input device may be a three-dimensional input device such as a three-dimensional button or a three-dimensional key.

In other embodiments, a computer-readable medium comprises program code for performing all or a portion of one or more of the methods described herein. These illustrative embodiments are mentioned not to limit or define the invention, but rather to provide examples to aid understanding thereof. Illustrative embodiments are discussed in the Detailed Description, which provides further description of the invention. Advantages offered by various embodiments of this invention may be further understood by examining this specification.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Example embodiments are described herein in the context of devices, systems and methods for using corrugated tessellation to create surface features. Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Device & Embodiment

Figure 1A:
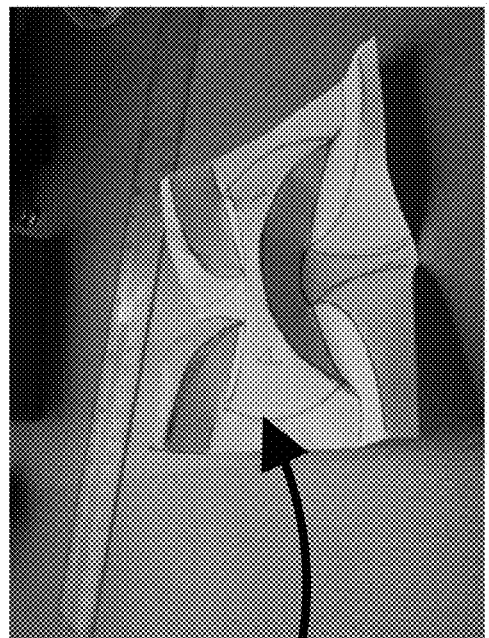
FIG. 1A illustrates an electronic device for using corrugated tessellation to create surface features in accordance with an embodiment.
Figure 1B:
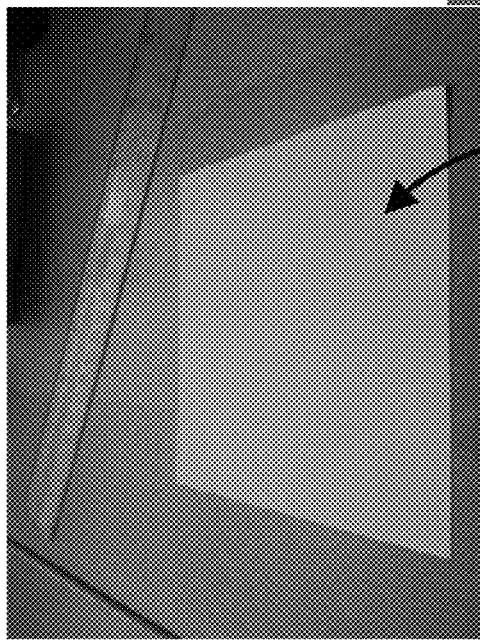
FIG. 1B illustrates an electronic device for using corrugated tessellation to create surface features in accordance with an embodiment.

FIGS. 1A and 1B illustrate a touch-sensitive surface 100 for using corrugated tessellation to create surface features. In embodiments, the touch-sensitive surface 100 is capable of being in a first configuration, as shown in FIG. 1A, and a second configuration, as shown in FIG. 1B. In the first configuration, the touch-sensitive surface 100 may have a flat topography. The touch-sensitive surface 100 may have a length and a width defining a surface. For example, in the first configuration the surface may be entirely or at least substantially smooth and/or flat. All or a portion of the surface of the touch-sensitive surface 100 may have a two-dimensional topography when the surface is in the first configuration.

In embodiments, a user can interact with the touch-sensitive surface 100 while the surface is in the first configuration. For example, if an electronic device comprises a touch-sensitive display having a touch-sensitive surface, then a user may be able to provide input to the electronic device by contacting locations on the display. Thus, if an image of a keyboard is displayed on the display, then a user can touch locations of the display corresponding to letters displayed on the display. For example, if a user contacts a location on the touch-sensitive display corresponding to the letter "A" shown on the display, then the electronic device may determine that the letter "A" should be displayed in a document being edited on the display. Therefore, in embodiments, when a touch-sensitive surface is in the first configuration, a user of the surface may provide input to the surface by contacting locations corresponding to virtual keys for a virtual, on-screen keyboard.

In embodiments, a user of an electronic device may prefer to provide input to the device using a physical keyboard rather than a virtual, on-screen keyboard. In this embodiment, the user of the surface can transform the touch-sensitive surface 100 into a physical keyboard by putting the flexible, touch-sensitive display into the second configuration. For example, a touch-sensitive surface may have one or more folds that allow a user to convert the surface from a first configuration, such as the configuration shown in FIG. 1A, to a second configuration, such as the configuration shown in FIG. 1B, by physically bending or otherwise manipulating the surface with physical force. As another example, the touch-sensitive surface 100 may be a bi-stable flexible surface that "pops" from the first configuration to the second configuration when pressure is applied to the surface. In some embodiments, the surface comprises or is otherwise connected with one or more actuators that transform the surface from the first configuration to the second configuration (and vice versa) when a signal is received indicating that the configuration should be changed. For example, a user may press a button on an electronic device to switch the touch-sensitive surface from the first configuration to the second configuration.

In the second configuration, the touch-sensitive surface 100 may have a raised topography. For example, the touch-sensitive surface 100 may have a length and a width defining a surface and at least part of the surface may be raised. Thus, in embodiments, at least a portion of the surface of the touch-sensitive surface 100 has a three-dimensional topography when the surface is in the second configuration. In embodiments, the surface 100 resembles a physical keyboard when the surface is in the second configuration. For example, the surface may have a physical button representing the letter "A" on a keyboard when the surface is in the second configuration. In embodiments, the surface does not have this physical button when the surface is in the first configuration. Thus, the surface can provide an additional input device when the surface is in the second configuration that is not available when the surface is in the first configuration. For example, a user may provide input to the surface by contacting locations on the surface corresponding to virtual, on-screen keys displayed on the surface when the display is in the first configuration and a user can provide input to the surface by pressing raised, physical keys created by changing the surface from the first configuration to the second configuration when the surface is in the second configuration. In embodiments, one or more of the physical keys are not present when the surface is in the first configuration and may only be present when the surface is in the second configuration. Numerous other embodiments are disclosed herein and variations are within the scope of this disclosure.

This illustrative example is given to introduce the reader to the general subject matter discussed herein. The invention is not limited to this example. The following sections describe various additional non-limiting embodiments and examples of devices, systems, and methods for parameter modification of haptic effects.

Illustrative Device

Figure 2:
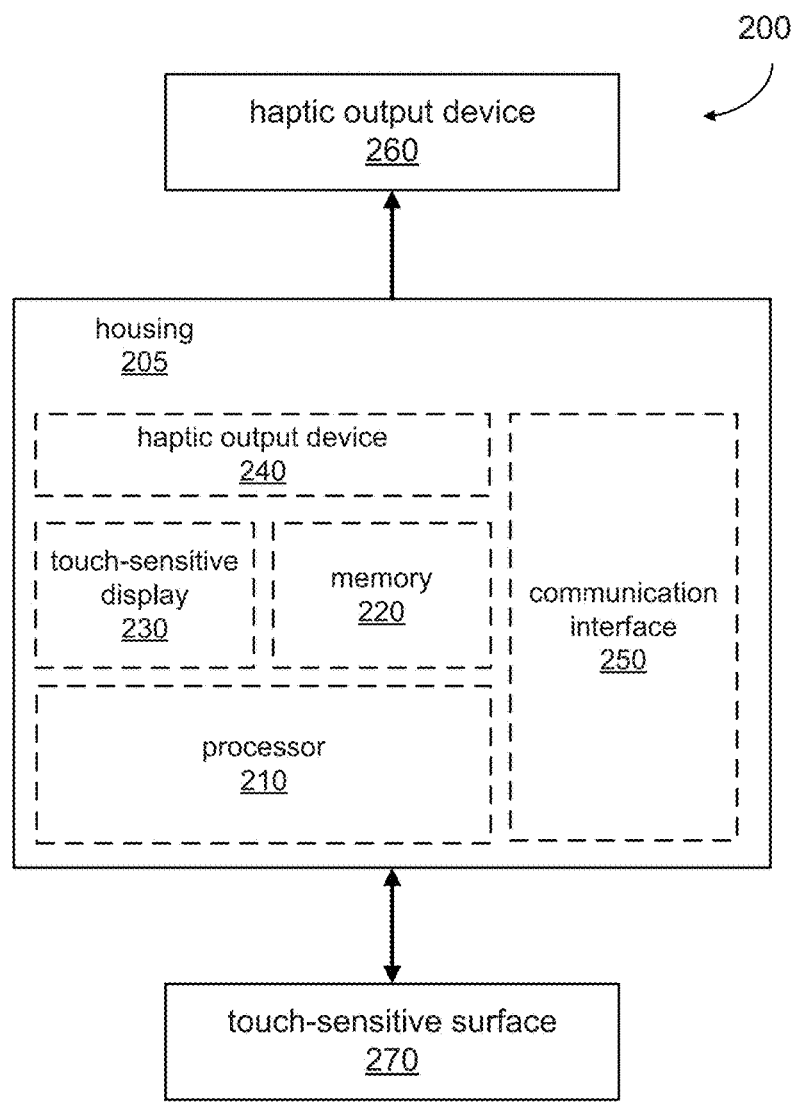
FIG. 2 illustrates an electronic device for using corrugated tessellation to create surface features in accordance with an embodiment.

FIG. 2 illustrates an electronic device 200 for using corrugated tessellation to create surface features according to one embodiment. In the embodiment shown in FIG. 2, the electronic device 200 comprises a housing 205, a processor 210, a memory 220, a touch-sensitive display 230, a haptic output device 240, a communication interface 250, and a touch-sensitive surface 270. In addition, the electronic device 200 is in communication with haptic output device 260, which may be optionally coupled to or incorporated into some embodiments. The processor 210 is in communication with the memory 220 and, in this embodiment, both the processor 210 and the memory 220 are disposed within the housing 205. The touch-sensitive display 230, which comprises or is in communication with a touch-sensitive surface, is partially disposed within the housing 205 such that at least a portion of the touch-sensitive display 230 is exposed to a user of the electronic device 200. In some embodiments, touch-sensitive display 230 and/or touch-sensitive surface 270 comprises or is otherwise connected with one or more haptic output devices, such as haptic output device 240 and/or haptic output device 260. In some embodiments, the touch-sensitive display 230 may not be disposed within the housing 205. For example, the electronic device 200 may be connected to or otherwise communicate with a touch-sensitive display 230 disposed within a separate housing. In some embodiments, the housing 205 may comprise two housings that are slidably coupled to each other, pivotably coupled to each other, or releasably coupled to each other. In some embodiments, the housing 205 comprises a flexible housing. In other embodiments, the housing 205 may comprise any number of housings.

In the embodiment shown in FIG. 2, the touch-sensitive display 230 is in communication with the processor 210 and is configured to provide signals to the processor 210 and/or the memory 220 and to receive signals from the processor 210 and/or memory 220. The memory 220 is configured to store program code or data, or both, for use by the processor 210, which is configured to execute program code stored in memory 220 and to transmit signals to and receive signals from the touch-sensitive display 230. In the embodiment shown in FIG. 2, the processor 210 is in communication with the communication interface 250 and is configured to receive signals from the communication interface 250 and to output signals to the communication interface 250 to communicate with other components or devices such as one or more electronic devices. In addition, the processor 210 is in communication with haptic output device 240 and haptic output device 260 and is further configured to output signals to cause haptic output device 240 or haptic output device 260, or both, to output one or more haptic effects.

Furthermore, the processor 210 is in communication with touch-sensitive surface 270 and is configured to receive signals from touch-sensitive surface 270. For example, processor 210 may receive one or more signals from touch-sensitive surface 270 corresponding with one or more interactions with the electronic device 200. For example, one or more sensor signals may be received by processor 210 from touch-sensitive surface 270 when a user of the electronic device 200 shakes the device 200. As another example, one or more sensor signals can be received by processor 210 from touch-sensitive surface 270 when a user presses a location on the touch-sensitive display 230 and/or when a user makes a gesture on touch-sensitive display 230. In some embodiments, processor 210 can receive sensor information from one or more sensors to derive or otherwise determine one or more interactions. Interactions can include, but are not limited to a contact, a series of contacts, a gesture, a contact pressure above a predetermined threshold, a contact pressure below a predetermined threshold, a contact on a touch-sensitive surface, a contact on a touch-screen display, a vibration, a shake, any other suitable interaction, or a combination thereof.

In embodiments, processor 210 receives one or more sensor signals from one or more input devices integrated into the electronic device 200, connected to the electronic device 200, and/or in communication with the electronic device 200. For example, the processor 210 may receive one or more sensor signals from a touch-sensitive surface of the touch-sensitive display 230. As another example, the processor 210 may receive one or more sensor signals from an input device such as a key, a keyboard, a button, a mouse, a touchpad, a trackball, a microphone, a touch-sensitive surface, and/or another suitable input device that is integrated into the electronic device 200, connected to the electronic device 200, and/or in communication with the electronic device 200. A sensor signal may comprise information such as one or more contacts, locations, pressures, gestures, key presses, and/or other information indicating how a user is interacting with one or more input devices. In embodiment, a sensor signal and/or a received signal comprises an audio signal, a video signal, an acceleration signal, a velocity signal, a temperature signal, another suitable signal, or a combination thereof. The processor 210 may then utilize the information it receives from one or more sensors, a touch-sensitive surface (such as touch-sensitive surface 270), one or more communication interfaces (such as communication interface 250), memory (such as memory 220), and/or another suitable input device.

In one embodiment, processor 210 receives one or more sensor signals from a button or a key integrated into the electronic device 200. For example, a user may press a physical button on the side of the electronic device 200 and, in response to pressing the button, one or more sensor signals may be received by processor 210. In one embodiment, one or more sensor signals received by processor 210 indicates that a touch sensitive surface, such as touch-sensitive surface 270, and/or a touch sensitive display, such as touch-sensitive display 230 (which may comprise or otherwise be connected with a touch sensitive surface), should be converted from a first configuration to a second configuration. For example, in one embodiment, touch-sensitive display 230 is in a first configuration such that the viewable portion of the display 230 feels flat or substantially flat to a user as the user interacts with the display. In this embodiment, a user may press a button on the electronic device 200 and/or may contact a location on the touch-sensitive display 230 to convert the touch-sensitive display 230 from the first configuration to a second configuration. For example, when a user presses a button on the electronic device 200, processor 210 may receive a signal that indicates that display 230 should be converted from the first configuration into a second configuration. In this embodiment, the processor may determine a layout for the display that is different than the current layout of the display. For example, a new layout comprising a physical, three-dimensional button may be determined and the current layout may not have the physical, three-dimensional button. As another example, a current layout may comprise a numeric keypad and a new layout comprising a physical alphanumeric keyboard may be determined. In addition, the processor may generate and output one or more signals configured to cause display 230 and/or surface 270 to convert from a current layout into a determined layout. Thus, if a current layout for display 230 is a numeric keypad and a determined layout is a three-dimensional alphanumeric keyboard, then processor 210 may generate one or more signals configured to cause display 230 to convert from the numeric keypad to the three-dimensional alphanumeric keyboard. Numerous other embodiments are disclosed herein and variations are within the scope of this disclosure.

The device illustrated in FIG. 2 is merely illustrative, and in various other embodiments, the electronic device 200 may comprise or be in communication with fewer or additional components and/or devices than shown in FIG. 2. For example, other user input devices such as a mouse, a keyboard, a camera and/or other input device(s) may be comprised within the electronic device 200 or be in communication with the electronic device 200. As another example, electronic device 200 may comprise or otherwise be in communication with one, two, three, or more sensors and/or one, two, three, or more haptic output devices. In another example, electronic device 200 may not comprise a communication interface 250 in one embodiment. As yet another example, electronic device 200 may not be in communication with haptic output device 260 in an embodiment. In some embodiments, an electronic device may comprise a touch-sensitive surface that is connectable to another electronic device. For example, a portable electronic device comprising a touch-sensitive surface capable of being in a first configuration and a second configuration may be connected to another device. In this embodiment, when the touch-sensitive surface is in the second configuration one or more physical keys, buttons, etc. may be defined that are not defined when the touch-sensitive surface is in the first configuration. Moreover, in this embodiment, a user may provide input to the other device by pressing and/or depressing the physical keys, buttons, etc. when the touch-sensitive surface is in the second configuration. Numerous other embodiments are disclosed herein and variations are within the scope of this disclosure.

In embodiments, a touch-sensitive surface can be capable of assuming any number of configurations. For example, as discussed herein, in one embodiment, a touch-sensitive surface can assume a first configuration and a second configuration. In this embodiment, in the second configuration the touch-sensitive surface may define an input device that is not defined when the touch-sensitive surface is in the first configuration. In various embodiments, a touch-sensitive surface can assume two, three, four, or more different configurations. In some embodiments, one or more input devices are defined when the touch-sensitive surface is in a particular configuration that are not defined when the touch-sensitive surface is one or more other configurations. For example, in an embodiment, a touch-sensitive surface may define a physical key when the touch-sensitive surface is in a first configuration that is not defined when it is in a second configuration. Similarly, in an embodiment, the touch-sensitive surface may define a different physical key when the touch-sensitive surface is in the second configuration that is not defined when the touch-sensitive surface is in the first configuration. Numerous other embodiments are disclosed herein and variations are within the scope of this disclosure.

Various other components may also be modified. For example, in some embodiments, touch-sensitive surface 270 is partially or fully disposed within housing 205. As another example, touch-sensitive surface 270 may be disposed within the housing 205 of the electronic device 200. In one embodiment, the electronic device 200 is not in communication with haptic output device 260 and does not comprise communication interface 250. In another embodiment, the electronic device 200 does not comprise a touch-sensitive display 230 or a communication interface 250, but comprises a touch-sensitive surface and is in communication with an external display. In other embodiments, the electronic device 200 may not comprise or be in communication with a haptic output device at all. In one embodiment, electronic device 200 is a flexible-touch sensitive surface that can be connected with another device to provide input to the other device when the touch-sensitive surface is in a second configuration. In this embodiment, electronic device 200 may comprise or otherwise be connected with one or more actuators or other haptic output devices that can convert the touch-sensitive surface from the first configuration to the second configuration. In some embodiments, electronic device 200 may comprise or otherwise be connected with one or more actuators or other haptic output devices that can convert the touch-sensitive surface from the second configuration to the first configuration. In various embodiments, the electronic device 200 may comprise or be in communication with any number of components, such as in the various embodiments disclosed herein as well as variations that would be apparent to one of skill in the art.

In embodiments, the electronic device 200 can be any device that is capable of receiving user input and that is capable of being in a first configuration and a second configuration where the electronic device, when in the second configuration, provides one or more input devices, such as a button, key, etc., that is not provided when the electronic device is in the first configuration. For example, the electronic device 200 in FIG. 2 includes a touch-sensitive display 230 that comprises a touch-sensitive surface. In some embodiments, a touch-sensitive surface may be overlaid on the touch-sensitive display 230. In other embodiments, the electronic device 200 may comprise or be in communication with a display and a separate touch-sensitive surface. In still other embodiments, the electronic device 200 may comprise or be in communication with a display and may comprise or be in communication with other user input devices, such as a mouse, a keyboard, keys, buttons, knobs, slider controls, switches, wheels, rollers, other manipulanda, or a combination thereof.

In some embodiments, one or more touch-sensitive surfaces may be included on or disposed within one or more sides of the electronic device 200. For example, in one embodiment, a touch-sensitive surface is disposed within or comprises a rear surface of the electronic device 200. In another embodiment, a first touch-sensitive surface is disposed within or comprises a rear surface of the electronic device 200 and a second touch-sensitive surface is disposed within or comprises a side surface of the electronic device 200. In some embodiments, the electronic device 200 may comprise two or more housing components, such as in a clamshell arrangement or in a slidable arrangement. For example, one embodiment comprises an electronic device 200 having a clamshell configuration with a touch-sensitive display disposed in each of the portions of the clamshell. Furthermore, in embodiments where the electronic device 200 comprises at least one touch-sensitive surface on one or more sides of the electronic device 200 or in embodiments where the electronic device 200 is in communication with an external touch-sensitive surface, the display 230 may or may not comprise a touch-sensitive surface. In some embodiments, one or more touch-sensitive surfaces may have a touch-sensitive surface. In such embodiments, a user may be able to bend or otherwise deform the touch-sensitive surface as a method of input. For example, in one embodiment, an electronic device has a touch-screen display and a user can deform the touch-screen display by pressing locations on the touch-screen display to input information to the electronic device. In other embodiments, one or more touch-sensitive surfaces may be rigid. In various embodiments, the electronic device 200 may comprise both flexible and rigid touch-sensitive surfaces.

The housing 205 of the electronic device 200 shown in FIG. 2 provides protection for at least some of the components electronic device 200. For example, the housing 205 may be a plastic casing that protects the processor 210 and memory 220 from foreign articles such as rain. In some embodiments, the housing 205 protects the components in the housing 205 from damage if the electronic device 200 is dropped by a user. The housing 205 can be made of any suitable material including but not limited to plastics, rubbers, or metals. In one embodiment, the housing is flexible. For example, the housing may bend or otherwise deform when a touch-sensitive surface in the house is converted from a first configuration to a second configuration. Various embodiments may comprise different types of housings or a plurality of housings. For example, in some embodiments, electronic device 200 may be a portable device, handheld device, toy, gaming console, handheld video game system, gamepad, game controller, desktop computer, portable multifunction device such as a cell phone, smartphone, personal digital assistant (PDA), eReader, portable reading device, handheld reading device, laptop, tablet computer, digital music player, remote control, medical instrument, etc. Numerous other embodiments are disclosed herein and variations are within the scope of this disclosure.

In the embodiment shown in FIG. 2, the touch-sensitive display 230 provides a mechanism for a user to interact with the electronic device 200. For example, the touch-sensitive display 230 detects the location or pressure, or both, of a user's finger in response to a user hovering over, touching, or pressing the touch-sensitive display 230 (all of which may be referred to as a contact in this disclosure). In some embodiments, the touch-sensitive display 230 may comprise, be connected with, or otherwise be in communication with one or more sensors that determine the location, pressure, a size of a contact patch, or any of these, of one or more contacts on the touch-sensitive display 230. For example, in one embodiment, the touch-sensitive display 230 comprises or is in communication with a mutual capacitance system. In another embodiment, the touch-sensitive display 230 comprises or is in communication with an absolute capacitance system. In some embodiments, the touch-sensitive display 230 may comprise or be in communication with a resistive panel, a capacitive panel, infrared LEDs, photodetectors, image sensors, optical cameras, or a combination thereof. Thus, the touch-sensitive display 230 may incorporate any suitable technology to determine a contact on a touch-sensitive surface such as, for example, resistive, capacitive, infrared, optical, thermal, dispersive signal, or acoustic pulse technologies, or a combination thereof. In some embodiments, the display is not touch-sensitive. In other embodiments, the electronic device 200 does not have a display.

In one embodiment, touch-sensitive surface 270 is capable of being in at least a first configuration. For example, touch-sensitive surface 270 can be configured such that the touch-sensitive surface is flat or substantially flat when in the first configuration. As another example, touch-sensitive surface 270 may have an exposed surface that is flat or substantially flat when the touch-sensitive surface 270 is in the first configuration. In one embodiment, the touch-sensitive surface does not have an input means when in the first configuration. For example, in the first configuration, the touch-sensitive surface 270, may not provide a key, a button, and/or a location on the touch-sensitive surface 270 that a user can interact with or otherwise press. In some embodiments, touch-sensitive surface 270 may provide one or more input means when in the first configuration. For example, touch-sensitive surface 270 may provide one or more keys, buttons, and/or locations on the touch-sensitive surface 270 that a use can interact with or otherwise press when the touch-sensitive surface 270 is in the first configuration.

In some embodiments, touch-sensitive surface 270 is capable of being in at least a second configuration different than the first configuration. For example, touch-sensitive surface 270 can be configured such that at least a portion of the touch-sensitive surface is raised and three-dimension when in the second configuration. As another example, touch-sensitive surface 270 may have an exposed surface that is raise or otherwise three-dimensional when the touch-sensitive surface 270 is in the second configuration. In one embodiment, the touch-sensitive surface 270 has an input means when the touch-sensitive surface is in the second configuration that is not present when the touch-sensitive surface is in the first configuration. For example, in the first configuration, the touch-sensitive surface 270 may not define a key, a button, and/or a location on the touch-sensitive surface 270 that a user can interact with or otherwise press to provide input to a device. In this embodiment, when the touch-sensitive surface 270 is in the second configuration, at least a portion of the touch-sensitive surface may define a physical key, a physical button, etc. that a user can press and/or depress to provide input to a device.

In other embodiments, the touch-sensitive surface 270 may provide one or more input means when in the first configuration and one or more different input means when in the second configuration. For example, when the touch-sensitive surface 270 is in the first configuration, a user may be able to contact locations on the touch-sensitive surface 270 to provide input to a device. In this embodiment, when the touch-sensitive surface 270 is in the second configuration, a raised, three-dimensional key may be defined by the touch-sensitive surface 270 that a user can press and/or depress to provide input to a device. In various embodiments, a user may or may not be able to provide input to a device by contacting locations on the touch-sensitive surface 270 when the touch-sensitive surface 270 is in the second configuration. Thus, in embodiments, when the touch-sensitive surface 270 is in the second configuration one or more input means and/or input devices are defined or otherwise provided that are in addition to and/or different from the input means and/or input devices that are defined or otherwise provided when the touch-sensitive surface 270 is in the first configuration. Numerous other embodiments are disclosed herein and variations are within the scope of this disclosure.

In some embodiments, a touch-sensitive surface 270 comprises at least a first portion and a second portion when the touch-sensitive surface is in the second configuration. For example, in one embodiment, touch-sensitive display 230 provides a viewable portion configured to display content on a first portion of the touch-sensitive display 230 and a second portion configured to receive input on a second portion of the touch-sensitive display 230 when the touch-sensitive display 230 is in the second configuration. In embodiments, the second portion defines one or more physical, three-dimensional keys, buttons, etc. when the touch-sensitive display is the in the second configuration. In one embodiment, the first portion and the second portion of the display 230 are angled relative to one another when the display 230 is in the second configuration. For example, the first portion of the display 230 can be angled relative to the second portion of the display such that a user can view content being displayed on the first portion of the display and can type or otherwise provide input using the second portion of the display. As another example, the first and second portions can be angled similar to an open clamshell where the first portion of the display is in the first portion of the open clamshell and the second portion of the display is in the second portion of the clamshell. In various embodiments, a relative angle between the first and second portions of a display 230 can be any number of angles including, but not limited to, thirty degrees, forty-five degrees, sixty degrees, seventy-five degrees, etc. Numerous other embodiments are disclosed herein and variations are within the scope of this disclosure.

Figure 3A:
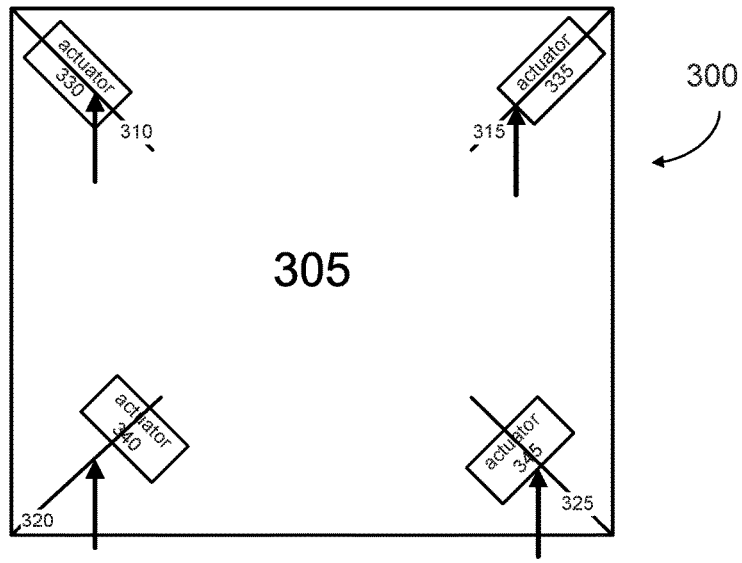
FIG. 3A illustrates an electronic device for using corrugated tessellation to create surface features in a surface in a first configuration having a flat or substantially flat viewing area in accordance with an embodiment.
Figure 3B:
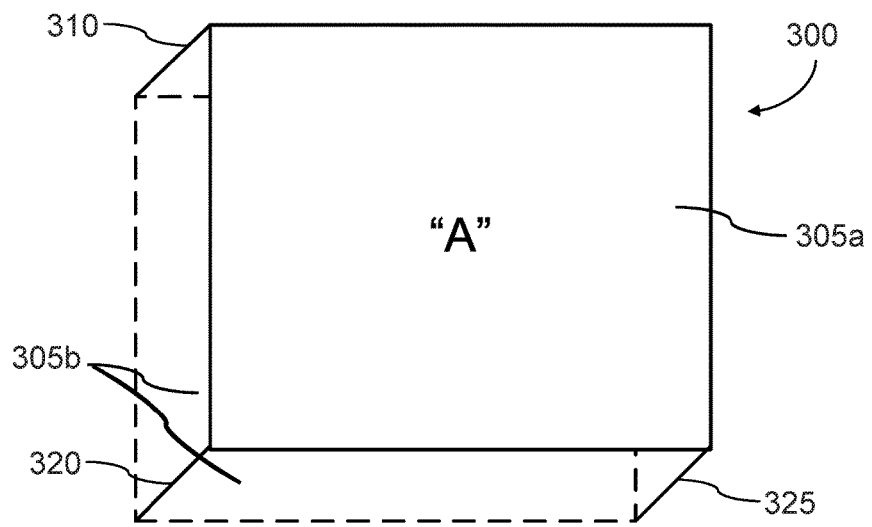
FIG. 3B illustrates an electronic device for using corrugated tessellation to create surface features in a surface to place the surface in a second configuration shown in this figure that defines an input device having a three-dimensional button or key in accordance with an embodiment.

In various embodiments, touch-sensitive display 230 and/or touch-sensitive surface 270 can be converted from a first configuration into a second configuration in any number of ways. In one embodiment, one or more folds can be built into touch-sensitive display 230 and/or touch-sensitive surface 270 to aid in the conversion from a first configuration to a second configuration. For example, FIGS. 3A and 3B illustrate an electronic device 300 for using corrugated tessellation to create surface features according to one embodiment. In the embodiment shown in FIG. 3A, the electronic device 300 comprises a surface 305 that comprises a plurality of folds 310-325. As shown in FIG. 3A, surface 305 is flat or substantially flat when in the first configuration. In embodiments, a touch-sensitive display includes surface 305. One or more folds (e.g., 310-325 in FIG. 3A) may be strategically placed such that, with an appropriate amount of pressure, the surface 305 bends or otherwise transforms from a first configuration, such as the first configuration shown in FIG. 3A, into a second configuration, such as the configuration shown in FIG. 3B. In some embodiments, one or more folds (e.g, 310-325 in FIG. 3A) may have built-in pressures for aiding conversion from a first configuration into a second configuration. For example, folds 310-325 can have a predetermined pressure such that if an appropriate force is applied to the folds, as represented by the arrows in FIG. 3A, then the surface 305 assumes the second configuration as shown by 305a and 305b in FIG. 3B. Thus, in one embodiment, if an appropriate force is applied to surface 305 the folds 310-325 can "snap" the surface 305 from the first configuration shown in FIG. 3A into the second configuration shown in FIG. 3B. As shown in FIG. 3B, surface 305a and 305b defines an input device having a three-dimensional button or key when in the second configuration. Numerous other embodiments are disclosed herein and variations are within the scope of this disclosure.

In the embodiment shown in FIG. 3A, the electronic device 300 comprises a plurality of actuators 330-345 to aid conversion from the first configuration to the second configuration and/or vice versa. In this embodiment, one or more of actuators may be strategically placed along a fold, such as actuators 330 and 335 shown in FIG. 3A placed along folds 310 and 315, respectively. In some embodiments, one or more actuators can placed across a fold, such as actuators 340 and 345 shown in FIG. 3A placed along folds 320 and 325, respectively. In one embodiment, the actuators provide an appropriate force to folds 310-325 to transform the surface 305 from the first configuration, as shown in FIG. 3A, into the second configuration, as shown in FIG. 3B. For example, when electronic device 300 receives a signal indicating that the surface should transform from a first configuration into a second configuration, one or more signals can be sent to actuators 330-345 thereby causing the actuators to apply the appropriate force to the folds. Thus, in one embodiment, an electronic device 300 can electronically convert the surface 305 from the first configuration into the second configuration and/or vice versa. In other embodiments, a user of an electronic device 300 can manually apply force to the surface 305 such that the surface 305 assumes a second configuration instead of a first configuration. Numerous other embodiments are disclosed herein and variations are within the scope of this disclosure.

Figure 3C:
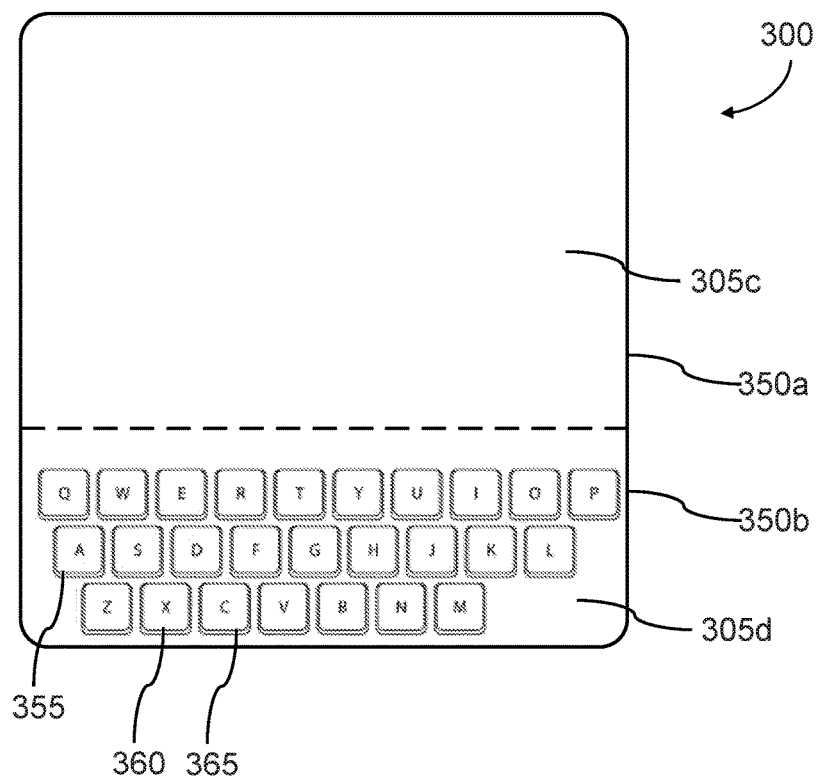
FIG. 3C illustrates an electronic device for using corrugated tessellation to create surface features in a surface to place the surface in a second configuration shown in this figure that defines an input device that is a physical keyboard having three-dimensional buttons or keys in accordance with an embodiment.

In the embodiment shown in FIG. 3C, electronic device 300 has a touch-sensitive display (collectively 350a and 350b) that includes a touch-sensitive surface (collectively 305c and 305d). In this example, the touch-sensitive display and touch-sensitive surface are in a second configuration. As shown in FIG. 3C, the touch-sensitive display has a first portion 350a that includes surface 305c and has a flat or substantially flat viewing area when in the second configuration. In this example, the touch-sensitive display also includes a second portion, 350b, that includes surface 305d and defines an input device when in the second configuration. The input device that is defined by surface 305d in the embodiment shown in FIG. 3C when in the second configuration is a physical keyboard that has a plurality of three-dimensional buttons or keys (e.g., 355, 360, 365, etc.). In some embodiments, the first portion 350a of the touch-sensitive display can be angled relative to the second portion 350b of the touch-sensitive display. In embodiments, the surface (collectively 305c and 305d) does not define the input device when in the first configuration that is defined when the surface is in the second configuration. In one embodiment, the first portion 305c and the second portion 305d of the surface is flat or substantially flat when in the first configuration. In this embodiment, both the first portion 350a and the second portion 350b of the touch-sensitive display has a flat or substantially flat viewing area when in the first configuration.

Figure 4:
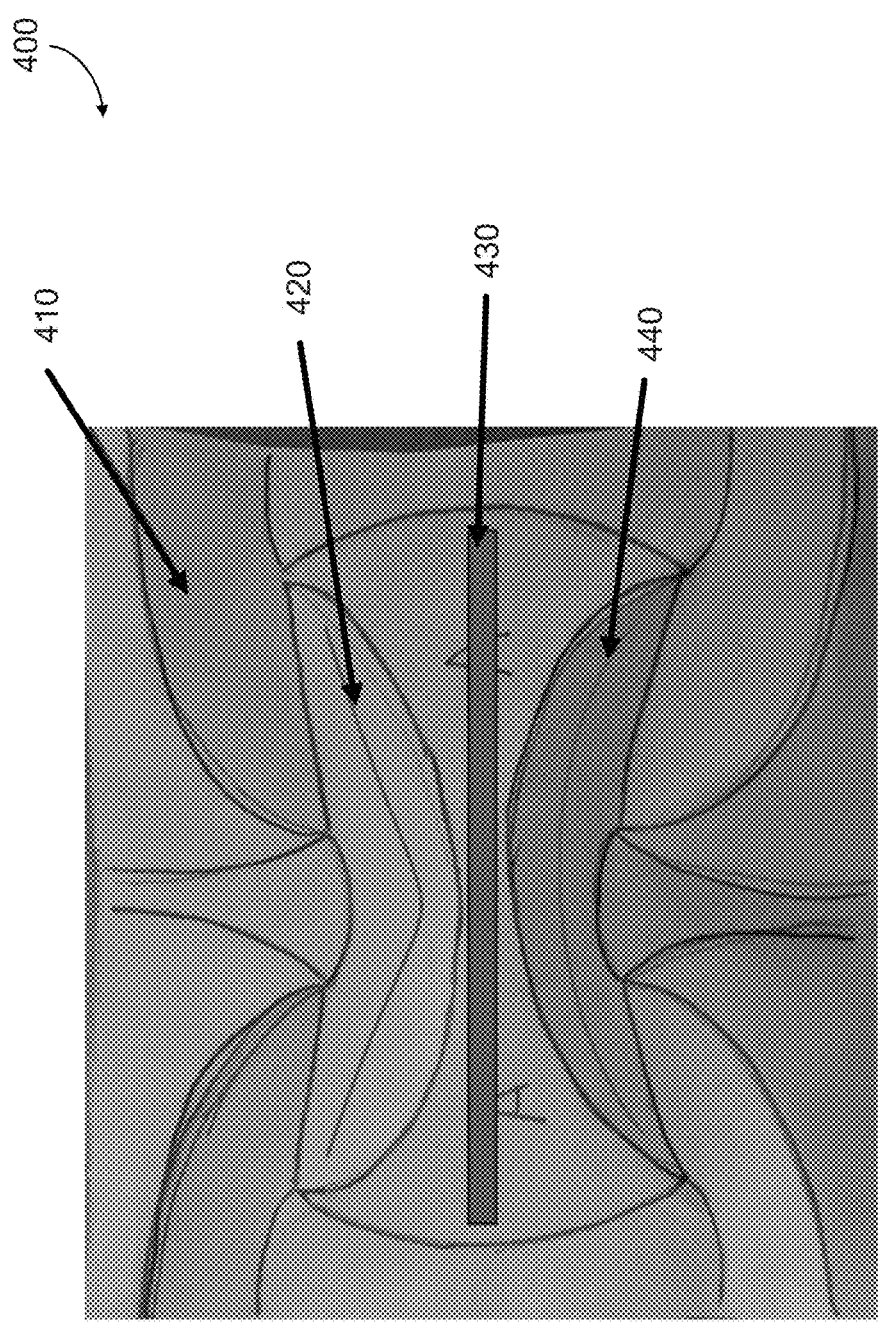
FIG. 4 illustrates an electronic device for using corrugated tessellation to create surface features in accordance with an embodiment.

FIG. 4 provides an example of an electronic device 400 that comprises a flexible surface 410 with one or more actuators. In the embodiment shown in FIG. 4, the flexible surface 410 is connected with or otherwise attached to actuators 420, 430, and 440. That actuators can aid conversion from a first configuration, such as a substantially flat configuration, to a second configuration, such as the configuration shown in FIG. 4, and/or vice versa in accordance with an embodiment. In various embodiments, the flexible surface 100 can have one or more actuators, such as actuators 420-440, attached to the top side, underside, and/or bonded as a layer and/or substance within the surface. In embodiments, any number of actuators may be used. For example, the flexible surface 410 in FIG. 4 is connected with three actuators 420, 430, and 440. In other embodiments, only one or two actuators may be connected with or otherwise attached to a flexible surface. In yet other embodiments, four, five, six, or more actuators may be attached to a flexible surface.

In FIG. 4, the actuators 420, 430, 440 can be energized thereby causing the flexible surface 410 to bend such that the surface's configuration changes from first configuration into a second configuration. For example, in embodiments, the actuators cause the flexible surface 410 to change from a substantially flat surface to a detectable three-dimensional relief surface when energized. In embodiments, one or more folds in the flexible surface are used to encourage buckling at intended positions. For example, one or more folds in the flexible surface can be used to encourage buckling at intended crests and valleys such that the flexible surface can be changed from the first configuration into the second configuration and/or vice versa. In some embodiments, the flexible surface 410 can have one or more folds that are not visible to a user of the device 400. In other embodiments, one or more folds in the flexible surface 410 may be visible. In yet other embodiments, the flexible surface 410 may not have any folds. Numerous other embodiments are disclosed herein and variations are within the scope of this disclosure.

Referring back to FIGS. 3A and 3B, in embodiments, the electronic device 300 is capable of assuming a first configuration, such as the configuration shown in FIG. 3A, and a second configuration, such as the configuration shown in 3B. In FIG. 3A, the first configuration comprises a surface 305 that is flat or substantially flat. For example, in FIG. 3A, if a user of electronic device 300 contacts surface 305 and moves across the surface 305 (e.g., makes a gesture across the surface with a finger), the surface may feel smooth to the user. In FIG. 3B, the second configuration comprises a surface 305 that is three-dimensional. For example, in the embodiment shown in FIG. 3B, if a user contacts the surface of the electronic device 300 when the surface is in the second configuration, the user can feel that the surface is not flat or not substantially flat. Rather, as shown in FIG. 3B, the surface defines an input device that is a three-dimensional, physical button corresponding to the letter "A" that can be pressed when the surface of the electronic device is in the second configuration. In the embodiment shown in FIGS. 3A and 3B, the surface does not define the three-dimensional, physical button when in the first configuration of FIG. 3A that is defined when the surface is in the second configuration of FIG. 3B. Thus, in embodiments, surface 305 can assume a first configuration and a second configuration. Further, in embodiments, surface 305 defines an input device when in the second configuration that is not defined when in the first configuration. In some embodiments, a user can interact with one or more input devices that are defined when the surface assumes the second configuration. For example, in FIG. 3B, a user may be able to type the letter "A" in the electronic device 300 by pressing the button that is defined when the surface 305 is in the second configuration. Numerous other embodiments are disclosed herein and variations are within the scope of this disclosure.

Referring back to FIG. 2, in one embodiment, touch-sensitive display 230 and/or touch-sensitive surface 270 can be placed into a holder that is configured to convert the display 230 and/or surface 270 from the first configuration into the second configuration. For example, a user may apply pressure to a display 230 and a display holder to connect display 230 with the display holder. In doing so, the display 230 may snap into or otherwise connect with the display holder thereby aiding in the conversion from the first configuration to the second configuration. For example, the display holder may hold down the edges of the display to encourage or otherwise force display 230 to convert from a first configuration that is flat or substantially flat into a second configuration having a corrugated shape.

In another embodiment, touch-sensitive display 230 and/or touch-sensitive surface 270 comprises one or more folds having built-in pressure that aid in the conversion from a first configuration to a second configuration. For example, touch-sensitive surface 270 may have one or more folds having a respective predefined tension built into the folds. In this embodiment, when a user bends, manipulates, or otherwise applies an appropriate amount of force to the touch-sensitive surface 270, then the surface 270 may convert from the first configuration to the second configuration. In one embodiment, the touch-sensitive surface 270 deteriorates from the second configuration into the first configuration over time. For example, once the touch-sensitive surface 270 is in the second configuration, it may periodically have to be reformed by applying additional force in order for the touch-sensitive surface to maintain the second configuration. In other embodiments, once the touch-sensitive surface 270 is in the second configuration, it maintains the second configuration until an appropriate amount of pressure is applied to convert the surface 270 from the second configuration into the first configuration. Numerous other embodiments are disclosed herein and variations are within the scope of this disclosure.

In embodiments, the fold(s) built into touch-sensitive display 230 and/or touch-sensitive surface 270 may provide a bi-stable device. For example, the touch-sensitive display 230 may be configured to be converted between a first stable configuration and a second stable configuration. In one embodiment, touch-sensitive display 230 may have a preference for being in a first configuration at least partially because of one or more folds having built-in tension. In this embodiment, touch-sensitive display 230 may remain in the first configuration until a particular amount of displacement force is applied at one or more locations of the display 230. In some embodiments, when the displacement force is applied to the display 230, the folds rapidly "pull in" or otherwise "snap" into other configurations thereby causing the display to be converted into the second configuration. For example, the display 230 may be flat or substantially flat and have a preference for being in this configuration. However, in the this embodiment, one or more folds can be strategically placed in the display 230 such that when a user bends the display or otherwise applies force to the display at one or more particular locations, then display will snap into a second configuration. In various embodiments, the second configuration defines one or more keys, buttons, etc. that a user can interact with to provide input to a device when the display 230 is in the second configuration. In this embodiment, the display 230 may remain the second configuration until converted back into the first configuration because of tension built into the folds. Numerous other embodiments are disclosed herein and variations are within the scope of this disclosure.

In some embodiments, one or more actuators or other suitable devices are integrated into or otherwise connected with touch-sensitive display 230 and/or touch-sensitive surface 270 to assist in the conversion from a first configuration to a second configuration. For example, one or more actuators may be strategically placed between folds on touch-sensitive surface 270 such that when the one or more actuators are actuated, they cause the touch-sensitive surface 270 to convert from the first configuration to the second configuration. As another example, one or more actuators may be placed across folds on the touch-sensitive surface 270 and when the one or more actuators are actuated, they cause the touch-sensitive surface 270 to convert from the first configuration to the second configuration. In other embodiments, one or more actuators can be configured to cause touch-sensitive surface 270 to convert from the second configuration back into the first configuration. In various embodiments, any suitable device can be used to apply force to one or more folds of touch-sensitive display 230 and/or touch sensitive surface 270 to convert or aid in the conversion of display 230 and/or surface 270 from a first configuration into a second configuration (or vice versa) including, but not limited to, the actuators and various haptic output devices disclosed herein. Numerous other embodiments are disclosed herein and variations are within the scope of this disclosure.

In embodiments, when touch-sensitive display 230 and/or touch-sensitive surface 270 is in the second configuration, input can be provided in any number of ways. As discussed above, when the display 230 and/or the surface 270 is in the second configuration, one or more keys, buttons, etc. can be defined. In this embodiment, a user can provide input to a device by pressing and/or depressing the defined keys, buttons, etc. In one embodiment, capacitive sensing can be used to differentiate between force exertion on particular locations defined by the display and/or surface when in the second configuration to determine whether a key, button, etc. has been pressed or depressed. In another embodiment, the conversion of the display 230 and/or the surface 270 provides a capacitive sensing field that can be used to sense relation motion in one or more keys, buttons, etc. that are defined by the display and/or the surface 270 when in the second configuration. In yet another embodiment, thin flexible actuators can detect pressure thereby serving as key press detectors for the key, buttons, etc. that are defined by the display 230 and/or the surface 270 when in the second configuration. In some embodiments, when touch-sensitive display 230 and/or touch sensitive surface 270 is the second configuration, one or more actuators or other suitable devices can be used to provide three-dimensional relief for one or more buttons, keys, etc. and may be used to detect input. For example, a key may "give way" when a user presses the key with sufficient force when the display 230 and/or surface is in the second configuration. Numerous other embodiments are disclosed herein and variations are within the scope of this disclosure.

In the embodiment shown in FIG. 2, haptic output devices 240 and 260 are in communication with the processor 210 and are configured to provide one or more haptic effects. For example, in one embodiment, when an actuation signal is provided to haptic output device 240, haptic output device 260, or both, by the processor 210, the respective haptic output device(s) 240, 260 outputs a haptic effect based on the actuation signal. For example, in the embodiment shown, the processor 210 is configured to transmit a haptic output signal to haptic output device 240 comprising an analog drive signal. In some embodiments, the processor 210 is configured to transmit a command to haptic output device 260, wherein the command includes parameters to be used to generate an appropriate drive signal to cause the haptic output device 260 to output the haptic effect. In other embodiments, different signals and different signal types may be sent to each of one or more haptic output devices. For example, in some embodiments, a processor may transmit low-level drive signals to drive a haptic output device to output a haptic effect. Such a drive signal may be amplified by an amplifier or may be converted from a digital to an analog signal, or from an analog to a digital signal using suitable processors or circuitry to accommodate the particular haptic output device being driven.

A haptic output device, such as haptic output devices 240 or 260, can be any component or collection of components that is capable of outputting one or more haptic effects. For example, a haptic output device can be one of various types including, but not limited to, an eccentric rotational mass (ERM) actuator, a linear resonant actuator (LRA), a piezoelectric actuator, a voice coil actuator, an electro-active polymer (EAP) actuator, a memory shape alloy, a pager, a DC motor, an AC motor, a moving magnet actuator, an E-core actuator, a smartgel, an electrostatic actuator, an electrotactile actuator, a deformable surface, an electrostatic friction (ESF) device, an ultrasonic friction (USF) device, or any other haptic output device or collection of components that perform the functions of a haptic output device or that are capable of outputting a haptic effect. Multiple haptic output devices or different-sized haptic output devices may be used to provide a range of vibrational frequencies, which may be actuated individually or simultaneously. Various embodiments may include a single or multiple haptic output devices and may have the same type or a combination of different types of haptic output devices. In some embodiments, one or more haptic output devices are directly or indirectly in communication with electronic device, such as via wired or wireless communication. In one embodiment, the electronic device can be placed in a vehicle or is integrated into a vehicle and one or more haptic output devices are embedded into the vehicle. For example, one or more haptic output devices may be embedded in a seat, steering wheel, pedal, etc. of the vehicle. In some embodiments, instead of having haptic output device 240 and/or haptic output device 260 or in addition to having haptic output device 240 and/or haptic output device 260, the electronic device 200 has one or more other output devices. For example, the electronic device 200 may have a speaker and/or a display. In one embodiment, the electronic device 200 has one or more haptic output devices, one or more speakers, and one or more displays. Numerous other embodiments are disclosed herein and variations are within the scope of this disclosure.

In various embodiments, one or more haptic effects may be produced in any number of ways or in a combination of ways. For example, in one embodiment, one or more vibrations may be used to produce a haptic effect, such as by rotating an eccentric mass or by linearly oscillating a mass. In some such embodiments, the haptic effect may be configured to impart a vibration to the entire electronic device or to only one surface or a limited part of the electronic device. In another embodiment, friction between two or more components or friction between at least one component and at least one contact may be used to produce a haptic effect, such as by applying a brake to a moving component, such as to provide resistance to movement of a component or to provide a torque. In order to generate vibration effects, many devices utilize some type of actuator and/or other haptic output device. Known haptic output devices used for this purpose include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys.

In other embodiments, deformation of one or more components can be used to produce a haptic effect. For example, one or more haptic effects may be output to change the shape of a surface or a coefficient of friction of a surface. In an embodiment, one or more haptic effects are produced by creating electrostatic forces and/or ultrasonic forces that are used to change friction on a surface. In other embodiments, an array of transparent deforming elements may be used to produce a haptic effect, such as one or more areas comprising a smartgel. Haptic output devices also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on. In some embodiments, a haptic effect is a kinesthetic effect.

In FIG. 2, the communication interface 250 is in communication with the processor 210 and provides wired or wireless communications, from the electronic device 200 to other components or other devices. For example, the communication interface 250 may provide wireless communications between the electronic device 200 and a wireless sensor or a wireless actuation device. In some embodiments, the communication interface 250 may provide communications to one or more other devices, such as another electronic device 200, to allow users to interact with each other at their respective devices. The communication interface 250 can be any component or collection of components that enables the multi-pressure touch-sensitive input electronic device 200 to communicate with another component or device. For example, the communication interface 250 may comprise a PCI network adapter, a USB network adapter, or an Ethernet adapter. The communication interface 250 may communicate using wireless Ethernet, including 802.11 a, g, b, or n standards. In one embodiment, the communication interface 250 can communicate using Radio Frequency (RF), Bluetooth, CDMA, TDMA, FDMA, GSM, WiFi, satellite, or other cellular or wireless technology. In other embodiments, the communication interface 250 may communicate through a wired connection and may be in communication with one or more networks, such as Ethernet, token ring, USB, FireWire 1394, fiber optic, etc. In some embodiments, electronic device 200 comprises a single communication interface 250. In other embodiments, electronic device 200 comprises two, three, four, or more communication interfaces. Thus, in embodiments, electronic device 200 can communicate with one or more components and/or devices through one or more communication interfaces. In other embodiments, an electronic device 200 may not comprise a communication interface 250.

In FIG. 2, the touch-sensitive surface 270 is in communication with the processor 210 and provides sensor information to the processor 210. For example, touch-sensitive surface 270 may provide one or more interactions to the processor 210. The touch-sensitive surface 270 may provide an input signal indicating one or more interactions. As another example, touch-sensitive surface 270 can provide information corresponding to one or more interactions with electronic device 200 to processor 210. In embodiments, the information the touch-sensitive surface 270 provides to processor 210 corresponds to an interaction with the entire electronic device 200, such as a user shaking the electronic device 200. In other embodiments, the information touch-sensitive surface 270 provides to processor 210 corresponds to an interaction with a part of the electronic device 200, such as a touch-sensitive display 230 or another suitable input device.

The embodiment shown in FIG. 2 depicts a single touch-sensitive surface 270. In some embodiments, multiple sensors can be used. Additionally, a sensor may be housed in the same component as the other components of the electronic device 200 or in a separate component. For example, in some embodiments, the processor 210, memory 220, and touch-sensitive surface 270 are all comprised in an electronic device 200, such as a portable music player, a portable telephone, and/or a wearable device. In some embodiments, a sensor is placed in component separate from another component that houses the memory and/or processor. For instance, a wearable sensor may be in communication with the processor and memory or an electronic device via a wired or wireless connection.

Electronic device 200 may comprise any number and/or type of sensing components. For example, electronic device 200 can comprise an accelerometer and/or gyroscope. A non-limiting list of examples of sensors and interactions is provided below:

TABLE 1

Exemplary Sensors and Conditions

| Sensor | Interaction Sensed |
|---|---|
| Accelerometer | Force in one, two, or three directions |
| Altimeter | Altitude |
| Thermometer | Ambient temperature; user body temperature |
| Heart rate monitor | Heart rate of device user |
| Skin resistance monitor | Skin resistance of device user |
| Oxygen sensor | Oxygen use of device user |
| Audio sensor/ microphone | Ambient audio and/or audio generated by device user |
| Photosensor | Ambient light |
| IR/Photosensor | User eye movement, position, body temperature |

TABLE 1-continued

Exemplary Sensors and Conditions

| Sensor | Interaction Sensed |
| --- | --- |
| Hygrometer | Relative humidity |
| Speedometer | Velocity |
| Pedometer/odometer | Distance traveled |
| Chronometer | Time of day, date |
| Weight | Mass or quantity of matter |

Illustrative Method of Using Corrugated Tessellation to Create Surface Features

Figure 5:
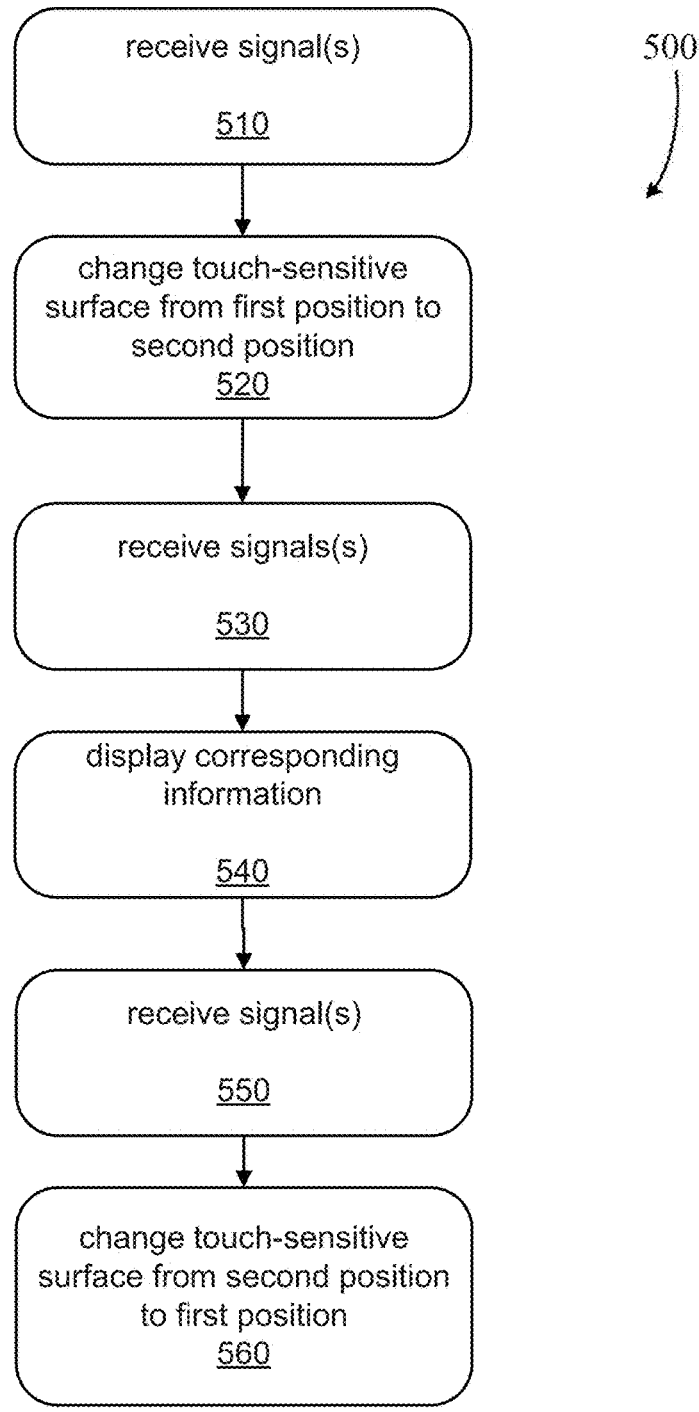
FIG. 5 illustrates a flow chart directed to a method creating a surface feature using corrugated tessellation in accordance with an embodiment.

FIG. 5 illustrates a flow chart directed to a method 500 of using corrugated tessellation to create surface features in accordance with an embodiment. The method 500 shown in FIG. 5 will be described with respect to electronic device 200 shown in FIG. 2.

The method 500 begins in block 510 when one or more signals are received. For example, a button on device 200 shown in FIG. 2 may be depressed which causes one or more signals to be sent to processor 210. As another example, a location on the touch-sensitive display 230 corresponding to a button, image, icon, text, etc. displayed on the display 230 may be contacted using a finger or another suitable object and one or more signals may be sent to the processor 210 in response to the contact. In some embodiments, processor 210 can receive one or more signals from another device—such as a tablet computer, cell phone, desktop computer, server, another suitable electronic device, etc.—through communication interface 250.

In embodiments, one or more received signals indicate that a touch-sensitive surface should be changed from a first configuration to a second configuration. For example, one or more signals may indicate that touch-sensitive surface 270 should be changed from a first configuration to a second configuration. As another example, one or more signals can indicate that the flexible touch-sensitive display 230 and/or a touch-sensitive surface associated with touch-sensitive display 230 should be changed from a first configuration to a second configuration. Numerous other embodiments are disclosed herein an variations are within the scope of this disclosure.

Referring back to method 500, once one or more signals are received 510, then method 500 proceeds to block 520. In block 520, a touch-sensitive surface is changed from a first configuration to a second configuration. For example, if one or more signals indicate that touch-sensitive surface 270 should be changed from a first configuration to a second configuration, then processor 210 may generate one or more signals configured to cause one or more actuators to change the configuration of touch-sensitive surface 270 from the first configuration to the second configuration. As another example, if one or more signals indicate that that flexible touch-sensitive display 230 should be changed from a first configuration to a second configuration, then processor 210 can generate one or more signals configured to cause one or more actuators to change the configuration of the flexible touch-sensitive display 230 from the first configuration to the second configuration.

In embodiments, a first configuration and/or a second configuration can include any number of configurations. In one embodiment, the first configuration is a completely or substantially flat configuration and the second configuration is a raised configuration. For example, touch-sensitive surface 270 may have a completely or substantially flat first configuration (e.g., a configuration similar to the configuration shown in FIG. 1A) and a raised, three-dimensional topography in the second configuration (e.g., a configuration similar to the configuration shown in FIG. 1B). As another example, flexible touch-sensitive display 230 can have a flat or substantially flat first configuration and a second configuration that is at least partially raised and has the appearance of one or more keys of a keyboard. In one embodiment, a user can view the entire display 230 when the display is in the first configuration and can view a first portion of the display 230 and type on physical, three-dimensional keys on a second portion of the display when the display is in the second configuration. Numerous other embodiments are disclosed herein and variations are within the scope of this disclosure.

In one embodiment, a touch-sensitive surface in a first configuration comprises a flat or substantially flat surface. For example, touch-sensitive display 230 may have an exposed surface with a flat or substantially flat topography such that the exposed surface feels flat or substantially flat to a user as the user contacts the exposed surface of the display. In one embodiment, a touch-sensitive surface in a second configuration comprises a raised topography. For example, in the second configuration, the touch-sensitive display 230 may have the appearance of a physical QWERTY keyboard. As another example, in the second configuration, the touch-sensitive display 230 may comprise a physical, three-dimensional representation of one or more buttons, keys, etc.

In embodiments, the functionality of the electronic device 200 differs when the touch-sensitive surface is in the second configuration than when the touch-sensitive surface is in the first configuration. For example, in one embodiment, if touch-sensitive surface 270 is in a first configuration that is substantially flat, then a user may not be able type using physical keys or buttons because they are not defined by the touch-sensitive surface 270; however, if the touch-sensitive surface 270 is in the second configuration, raised keys, buttons, etc. may be defined by the touch-sensitive surface thereby allowing a user to provide input to the electronic device 200 by pressing and/or depressing the keys, buttons, etc. As another example, a three-dimensional, physical button and/or a three-dimensional keyboard may be defined by the flexible touch-sensitive display 230 when the flexible touch-sensitive display is in the second configuration, but the three-dimensional, physical button and/or the three-dimensional keyboard may not be defined when the flexible touch-sensitive display 230 is in the first configuration. Thus, in embodiments, a user can depress the button when the flexible touch-sensitive display 230 is in the second configuration, but cannot do so when the flexible touch-sensitive display 230 is in the first configuration.

In one embodiment, flexible touch-sensitive display 230 is flat or substantially flat in a first configuration. For example, an entire exposed surface of touch-sensitive display 230 may be flat or substantially flat when the display 230 is in the first configuration. In this embodiment, a first portion of the touch-sensitive display 230 may be flat or substantially flat and a second portion of the touch-sensitive display 230 can be corrugated into one or more physical keys of a keyboard when the touch-sensitive display 230 is in a second configuration. Thus, in the second configuration, a user may be able to type on the physical keys in the second portion of the display 230 and view content on the first portion of the display 230. In one embodiment, in the second configuration, the first and second portions of the touch-sensitive display 230 are angled such that the second portion can lay flat against a surface, such as a desk, thereby allowing a user to interact with the physical keys, buttons, etc. defined by the second portion of the touch-sensitive display and the first portion of the touch-sensitive display is angled such that a user can easily view content displayed on the second portion of the display. In embodiments the relative angle between the first portion of the display and the second portion of the display can be any angle such as forty-five degrees, sixty degrees, or another suitable angle.

In one embodiment, a touch-sensitive surface is inert when in a first configuration and functional when in a second configuration. Referring to FIG. 2, touch-sensitive surface 270 may be flat or substantially flat when in the first configuration. For example, the touch-sensitive surface 270 may have a smooth surface area similar to an unfolded piece of paper and/or similar to the surface area of the touch-sensitive surface shown in FIG. 1A when in the first configuration. In this embodiment, the touch-sensitive surface may be non-functional when the touch-sensitive surface is in the first configuration. For example, a user may not be able to provide input to the electronic device 200 using the touch-sensitive surface when the touch-sensitive surface is in the first configuration. In other embodiments, the touch-sensitive surface is functional when in the first configuration. For example, the touch-sensitive surface may be used to provide input to electronic device 200 when the touch-sensitive surface is in the first configuration. As another example, a user may be able to contact one or more locations on the touch-sensitive surface when the touch-sensitive surface is in the first configuration to provide input to electronic device 200.

In some embodiments, a touch-sensitive surface is configured to provide input to one or more devices when in a second configuration. Referring to FIG. 2, touch-sensitive surface 270 may be at least partially raised when in the second configuration. For example, the touch-sensitive surface 270 may be bended, folded, or otherwise manipulated into the second configuration. In the second configuration, the touch-sensitive surface may define one or more physical, three-dimensional keys, buttons, keypads, keyboards, etc. that a user can press and/or depress to interact with the touch-sensitive surface. For example, in one embodiment, an electronic device comprising a touch-sensitive surface may be connected with another device, such as a smartphone, tablet computer, desktop computer, etc. through a wired connection, such as a USB connection, PS/2 connection, etc., and/or through a wires connection, such as WiFi, Bluetooth, etc. In this embodiment, when the touch-sensitive surface is in the second configuration and connected with the other device, the touch-sensitive surface may be used to provide input to the other device. For example, the touch-sensitive surface may be used as a keyboard to provide input to another device when the touch-sensitive surface is in the second configuration and connected with the other device. Numerous other embodiments are disclosed herein and variations are within the scope of this disclosure.

In embodiments, any number of devices including, but not limited to, a linear resonant actuator (LRA), a piezoelectric actuator, an electro-active polymer (EAP) actuator, a thin-film actuator, a memory shape alloy, a DC motor, an AC motor, a moving magnet actuator, an E-core actuator, a smartgel, or any other suitable device or collection of devices may be used to change a touch-sensitive surface from a first configuration to a second configuration. For example, one or more of these devices may be connected with touch-sensitive display 230 or touch-sensitive surface 270 and can be configured to cause the display 230 or surface 270 to change from a first configuration to a second configuration. Numerous other embodiments are disclosed herein and variations are within the scope of this disclosure.

Referring back to method 500, once the touch-sensitive surface has been changed from the first configuration to the second configuration 520, then method 500 proceeds to block 530. In block 530, one or more signals are received 530. For example, one or more signals may be received by processor 210 from touch-sensitive display 230 and/or touch-sensitive surface 270. In one embodiment, processor 210 receives one or more signals from touch-sensitive display 230 as a user interacts with one or more input devices that are defined when the display 230 is in the second configuration. For example, when the touch-sensitive display 230 is in the second configuration, at least a portion of the touch-sensitive display may define one or more physical, three-dimensional keys of a keyboard. In embodiments, one or more keys of the keyboard are not defined when the touch-sensitive display is in the first configuration. In this embodiment, a user can provide input to the electronic device 200 by pressing keys that are defined by the touch-sensitive display 230 when the display is in the second configuration. In this way, a user may be able to type on the portion of the touch-sensitive display defining the keys in much the same way as a user types on a traditional keyboard. Numerous other embodiments are disclosed herein and variations are within the scope of this disclosure.

Referring back to method 500, once one or more signals are received 530, then method 500 proceeds to block 540. In block 540, information corresponding to the received signals can be displayed on a display. For example, as a user interacts with a touch-sensitive surface in the second configuration that defines one or more keys, buttons, etc., information corresponding to key presses, clicks, etc. can be displayed on a display. In one embodiment, a portion of touch-sensitive display 230 defines a keyboard when the display 230 is in the second configuration. In this embodiment, as the user types on the keyboard, the letters corresponding to the various key presses can be displayed on another portion of the touch-sensitive display. In another embodiment, touch-sensitive surface 270 is in communication with the electronic device 200 and defines one or more keys and/or buttons when surface 270 is in the second configuration. In this embodiment, information corresponding to a user's interactions with the keys and/or buttons can be sent from the touch-sensitive surface 270 and displayed on display 230. For example, if a user presses a physical key corresponding to the letter "B" on the touch-sensitive surface 270, then the letter "B" may be displayed on display 230. As another example, if a user presses a key or a button defined by touch-sensitive surface 270 when the surface 270 is in the second configuration and the key press corresponds to a selection of an item, such as a hyperlink, menu, icon, etc., displayed on display 230, then the display 230 can be updated to reflect that the item has been selected. Numerous other embodiments are disclosed herein and variations are within the scope of this disclosure.

Referring back to method 500, once information has been displayed on the display, then method 500 proceeds to block 550. In block 550, one or more signals are received. In one embodiment, one or more received signals indicates that the touch-sensitive display 230 and/or the touch-sensitive surface 270 should be converted from the second configuration to the first configuration. For example, a user may press a button on the side of electronic device 200 that indicates that touch-sensitive surface 270 should be changed from the second configuration to the first configuration. As another example, a user may contact a particular location on display 230 and/or press a key or a button defined when the display 230 is in the second configuration that indicates that the touch-sensitive display should be converted from the second configuration to the first configuration. In one embodiment, a key, a button, and/or a location on display 230 may be pressed or otherwise contacted that indicates that touch-sensitive surface 270 should be converted from the second configuration to the first configuration. In another embodiment, a key a button, and/or a location on touch-sensitive surface 270 may be pressed or otherwise contacted that indicates that display 230 should be converted form the second configuration to the first configuration. Numerous other embodiments are disclosed herein and variations are within the scope of this disclosure.

Referring back to method 500, once one or more signals have been received 550, then method 500 proceeds to block 560. In block 560, the touch-sensitive surface is changed from the second configuration to the first configuration. For example, if a received signal indicates that touch-sensitive surface 270 should be converted from a second portion to a first configuration, then the touch-sensitive surface may be converted from the second configuration to the first configuration. As another example, if one or more received signals indicates that a portion of display 230 should be converted from a second configuration to a first configuration, then the portion of the display can be converted from the second configuration to the first configuration. In various embodiments, the touch-sensitive display 230 and/or the touch sensitive surface 270 can be converted from a second configuration to a first configuration in any number of ways including those discussed herein with respect to converting the touch-sensitive display 230 and/or the touch-sensitive surface from a first configuration to a second configuration. Numerous other embodiments are disclosed herein and variations are within the scope of this disclosure.

Illustrative Method of Using Corrugated Tessellation to Create Surface Features

Figure 6:
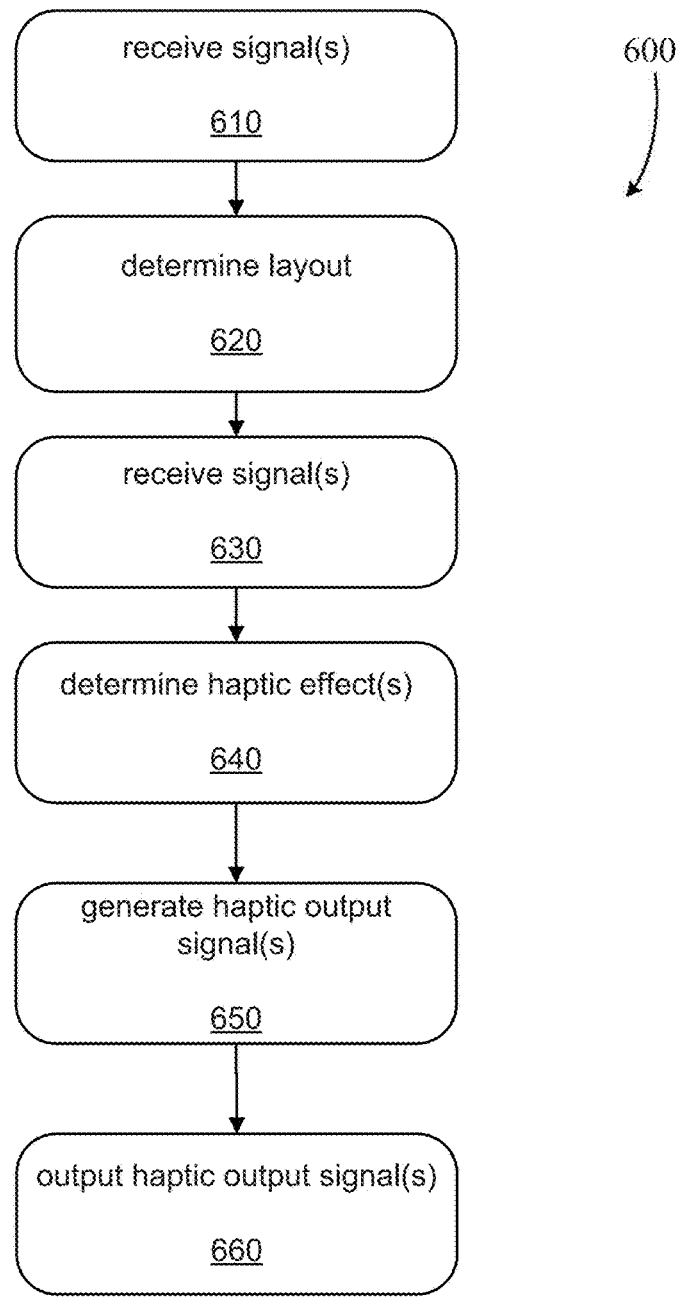
FIG. 6 illustrates a flow chart directed to a method creating a surface feature using corrugated tessellation in accordance with an embodiment.

FIG. 6 illustrates a flow chart directed to a method 600 of using corrugated tessellation to create surface features in accordance with an embodiment. The method 600 shown in FIG. 6 will be described with respect to electronic device 200 shown in FIG. 2.

The method 600 begins in block 610 when one or more signals are received. For example, a button on device 200 shown in FIG. 2 may be depressed which causes one or more signals to be sent to processor 210. As another example, a location on the touch-sensitive display 230 corresponding to a button, image, icon, text, etc. displayed on the display 230 may be contacted using a finger or another suitable object and one or more signals may be sent to the processor 210 in response to the contact. In some embodiments, processor 210 can receive one or more signals from another device—such as a tablet computer, cell phone, desktop computer, server, another suitable electronic device, etc.—through communication interface 250.

In embodiments, one or more received signals indicate that a touch-sensitive surface should be changed to a new layout. For example, one or more signals may indicate that touch-sensitive surface 270 should be changed from a first layout (e.g., a current layout), to a second layout (e.g., a new layout). As another example, one or more signals can indicate that the flexible touch-sensitive display 230 and/or a touch-sensitive surface associated with touch-sensitive display 230 should be changed from a first layout to a second layout. In one embodiment, the first layout comprises a flat or substantially flat surface for display 230 and/or surface 270. In other embodiments, the first layout comprises a portion of display 230 and/or a portion of surface 270 that is flat or substantially flat. In some embodiments, the second layout comprises a portion of display 230 and/or a portion of surface 270 that is raised or otherwise three-dimensional. For example, the second layout for a portion of surface 270 may comprise one or more physical, three-dimensional keys, buttons, etc. In some embodiments, one or more keys, buttons, etc. that are defined in the second layout are not defined in the first layout. Numerous other embodiments are disclosed herein an variations are within the scope of this disclosure.

Referring back to method 600, once one or more signals are received 610, then method 600 proceeds to block 620. In block 620, a layout is determined. In one embodiment, a layout is determined based at least in part on one or more received signals. For example, if a signal indicates a particular layout for touch-sensitive display 230, then a determination may be made by electronic device 200 to use the particular layout. In another embodiment, a layout is determined based at least in part on a selection between two or more available layouts. For example, a menu of available layouts for a touch-sensitive surface 270 may be displayed on display 230 and a user can select which of the available layouts the touch-sensitive surface 270 should use. As another example, display 230 may display icons corresponding to the available layouts for the display 230. In this example, a user can select which layout to use by contacting the display 230 at a location corresponding to the layout that the user wants to use. In various embodiments, the display 230 and/or the surface 270 is updated in response to the selection of a new layout so that the display 230 and/or the surface 270 corresponds with the selected layout. For example, if the selected layout comprises a physical, three-dimensional keypad comprising keys for the numbers 1 thru 9, then the layout of surface 270 may be change so that the surface comprises physical, three-dimensional keys for the numbers 1 thru 9.

In one embodiment, one or more signals are received from another device through a communication interface and used to determine a layout for display 230 and/or surface 270. For example, if electronic device 200 receives a web page comprising a map with a particular topography, then the electronic device 200 may determine a three-dimensional layout corresponding to the particular topography. Thus, in one embodiment, if a first portion of the map represents a map and a second portion of the map represents flat land, then the electronic device may determine a layout where a first portion of the layout corresponding to the mountain that is physically, three-dimensionally taller than a second portion of the layout corresponding to the flat land on the map. In other words, in one embodiment, a determined layout three-dimensionally represents information that received from another device or memory, such as a map or other information. Numerous other embodiments are disclosed herein and variations are within the scope of this disclosure.

In embodiments, once a layout has been determined, touch-sensitive display 230 and/or touch-sensitive surface 270 is updated to reflect the determined layout. For example, touch-sensitive display 230 may be updated so that it three-dimensionally reflects the determined layout corresponding to a map that was used to determine the layout. As another example, if a particular layout is selected by a user, then touch-sensitive surface 270 may be changed to three-dimensionally reflect the selected layout. Numerous other embodiments are disclosed herein and variations are within the scope of this disclosure.

Referring back to method 600, once a layout has been determined 620, then method 600 proceeds to block 630. In block 630, one or more signals are received 630. For example, if display 230 is changed to three-dimensionally reflect the determined layout and the determined layout defines one or more keys, buttons, etc., then a user may be able to interact with the keys, buttons, etc. that are defined by the display 230. Thus, a user may be able to press a button defined by display having the determined layout. As another example, in one embodiment, a user can press and/or depress a key defined by display 230 when the display 230 has the determined layout. In various embodiments, display 230 and/or surface 270 defines one or more different inputs, such as keys, buttons, etc. when in the determined format than when in another format. Numerous other embodiments are disclosed herein and variations are within the scope of this disclosure.

Referring back to method 600, once one or more signals are received 630, then method 600 proceeds to block 640. In block 640, one or more haptic effects are determined. For example, if display 230 is in a determined layout that defines a key and a user presses the key, then the electronic device 200 may determine that one or more haptic effects should be output that indicate that the key has been pressed. As another example, if touch sensitive surface 270 is converted from a first layout to a second layout then one or more haptic effects may be output by haptic output device 240 and/or haptic output device 260 to indicate that the layout of surface 270 has changed. In one embodiment, if surface 270 is in a determined layout that defines a button and a user presses the button to indicate a selection of an item displayed on display 230, then one or more haptic effects may be determined that indicate that the item has been selected. Numerous other embodiments are disclosed herein and variations are within the scope of this disclosure.

Referring back to method 600, once one or more haptic effects are determined 640, then method 600 proceeds to block 650. In block 650, one or more haptic output signals are generated. For example, processor 210 may generate one or more haptic output signals configured to cause the one or more determined haptic effects. Numerous other embodiments are disclosed herein and variations are within the scope of this disclosure.

Referring back to method 600, once one or more haptic output signals have been generated 650, then method 600 proceeds to block 660. In block 660, one or more haptic output signals are output. For example, processor 210 may output one or more of the generated signals to haptic output device 240 and/or haptic output device 260. In response to receiving one or more signals, haptic output device 240 and/or haptic output device 260 may output one or more haptic effects corresponding to the determined haptic effects. Numerous other embodiments are disclosed herein and variations are within the scope of this disclosure.

General

While the methods and systems herein are described in terms of software executing on various machines, the methods and systems may also be implemented as specifically-configured hardware, such as field-programmable gate array (FPGA) specifically configured to execute the various methods. For example, embodiments can be implemented in digital electronic circuitry, or in computer hardware, firmware, software, or in a combination thereof. In one embodiment, a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

That which is claimed is:

1. A device, comprising:
a bi-stable touch-sensitive surface comprising at least one predefined tension feature configured to snap between a first stable configuration and a second stable configuration;
wherein, when in the first configuration, the at least one predefined tension feature is configured to maintain the first stable configuration and the second stable configuration; and wherein, in response to a first force above a first threshold applied to the bi-stable touch-sensitive surface in the first stable configuration, the at least one predefined tension feature is configured to snap the bi-stable touch-sensitive surface from the first stable configuration into the second stable configuration;

wherein, in response to a second force above a second threshold applied to the bi-stable touch-sensitive surface in the second stable configuration, the at least one predefined tension feature is configured to snap the bi-stable touch-sensitive surface from the second stable configuration into the first stable configuration; and wherein the bi-stable touch-sensitive surface defines a first three-dimensional input device when in the second stable configuration that is not defined when in the first stable configuration.

2. The device of claim 1, wherein the bi-stable touch-sensitive surface defines a substantially flat surface when in the first stable configuration and a detectable three-dimensional relief surface when in the second stable configuration.

3. The device of claim 1, wherein the first input device comprises at least one of a three-dimensional button or a three-dimensional key.

4. The device of claim 1, wherein the first input device comprises a physical keyboard.

5. The device of claim 1, further comprising:
a touch-sensitive display comprising the bi-stable touch-sensitive surface, the touch-sensitive display configured to receive input via contact with locations on the touch-sensitive display when the bi-stable touch-sensitive surface is in the first stable configuration, the touch-sensitive display configured to receive input via the first input device when the bi-stable touch-sensitive surface is in the second stable configuration.

6. The device of claim 5,
wherein the touch-sensitive display comprises a substantially flat viewing area when the bi-stable touch-sensitive surface is in the first stable configuration, and
wherein the touch-sensitive display comprises a first portion comprising a substantially flat viewing area and a second portion defining the first input device when the bi-stable touch-sensitive surface is in the second stable configuration.

7. The device of claim 6, wherein the first portion is angled relative to the second portion.

8. The device of claim 1, wherein the at least one predefined tension feature in the bi-stable touch-sensitive surface comprises a plurality of predefined tension features.

9. The device of claim 8, wherein the force comprises a manual bending of a portion of the bi-stable touch-sensitive surface.

10. The device of claim 8, further comprising:
a plurality of actuators, wherein each of the plurality of actuators is positioned along a respective predefined tension feature from the plurality of predefined tension features, and wherein the plurality of actuators are configured to apply the force to the plurality of predefined tension features.

11. The device of claim 10,
wherein the first input device comprises a keyboard comprising a key, and
wherein an actuator from the plurality of actuators is configured to detect a pressure corresponding to a key press of the key when the bi-stable touch-sensitive surface is in the second stable configuration.

12. The device of claim 1, wherein the device defines a first plurality of input devices when the bi-stable touch-sensitive surface is in the first stable configuration and a second plurality of input devices when the bi-stable touch-sensitive surface is in the second stable configuration, the first plurality of input devices not comprising the first input device and the second plurality of input devices comprising the first input device.

13. The device of claim 1, wherein the device is at least one of a wireless phone or a tablet computer.

14. A method, comprising:
receiving, by a processor, a first input indicating that a bi-stable touch-sensitive surface should be converted from a first stable configuration to a second stable configuration different than the first stable configuration;

generating, by the processor, a first signal configured to cause a plurality of actuators to apply a first force to at least one predefined tension feature in the bi-stable touch-sensitive surface, wherein the first force is greater than a first threshold, and wherein, in response to the first force exceeding the threshold applied to the at least one predefined tension feature, the at least one predefined tension feature is configured to snap the bi-stable touch-sensitive surface from the first stable configuration into the second stable configuration;

outputting, by the processor, the first signal to the plurality of actuators; and applying, by the plurality of actuators, the first force above the threshold to the at least one predefined tension feature in the bi-stable touch-sensitive surface to cause the at least one predefined tension feature to snap the bi-stable touch-sensitive surface from the first stable configuration into the second stable configuration;

receiving, by a processor, a second input indicating that a bi-stable touch-sensitive surface should be converted from the second stable configuration to the first stable configuration;

generating, by the processor, a second signal configured to cause the plurality of actuators to apply a second force to the at least one predefined tension feature, wherein the second force is greater than a second threshold, and wherein, in response to the second force exceeding the second threshold applied to the at least one predefined tension feature, the at least one predefined tension feature is configured to snap the bi-stable touch-sensitive surface from the second stable configuration into the first stable configuration;

outputting, by the processor, the second signal to the plurality of actuators; and applying, by the plurality of actuators, the second force above the threshold to the at least one predefined tension feature to cause the at least one predefined tension feature to snap the bi-stable touch-sensitive surface from the second stable configuration into the first stable configuration wherein the bi-stable touch-sensitive surface defines a first three-dimensional input device when in the second stable configuration that is not defined when in the first stable configuration.

15. The method of claim 14, further comprising:
receiving, by the processor, a third input via the first input device when the bi-stable touch-sensitive surface is in the second stable configuration; and displaying, by the processor, information on a display associated with the bi-stable touch-sensitive surface based at least in part on the third input.

16. A method, comprising:

receiving, by a processor, a selection of a first layout different from a current layout of a bi-stable touch-sensitive surface, wherein the bi-stable touch-sensitive surface defines a first three-dimensional input device when in the first layout that the bi-stable touch-sensitive surface does not define when in the current layout, and wherein the bi-stable touch-sensitive surface comprises at least one predefined tension feature configured to: (i) snap the bi-stable touch-sensitive surface from the current layout into the first layout in response to a first force above a first threshold applied to the at least one predefined tension feature, and (ii) snap the bi-stable touch-sensitive surface from the first layout into the current layout in response to a second force above a second threshold applied to the at least one predefined tension feature;

generating, by the processor, a signal configured to cause at least one actuator to apply the force above the threshold to the at least one predefined tension feature;

outputting, by the processor, the signal to the at least one actuator; and in response to outputting the signal to the at least one actuator, applying, by the at least one actuator, the force above the threshold to the at least one predefined tension feature to snap the bi-stable touch-sensitive surface from the current layout into the first layout or from the first layout into the current layout.

17. The method of claim 16, wherein the current layout comprises the bi-stable touch-sensitive surface having a substantially flat surface, the first layout comprises the bi-stable touch-sensitive surface having a three-dimensional surface comprising the first input device, the first input device comprising a three-dimensional input device.

* * * * *